United States Patent [19]
Mager

[11] 3,792,742
[45] Feb. 19, 1974

[54] ELECTRIC MOTOR OPERATED VEHICLE

[76] Inventor: Charles J. Mager, Box 353A R.D. No. 4, Quakertown, Pa. 18951

[22] Filed: Feb. 8, 1972

[21] Appl. No.: 224,475

[52] U.S. Cl............... 180/65 F, 188/156, 188/159, 310/67 R, 318/139, 320/61
[51] Int. Cl............................ B60l 7/24, B60k 7/00
[58] Field of Search... 180/65 R, 65 F, 60; 318/139; 320/61; 188/159, 160, 156; 310/67

[56] References Cited
UNITED STATES PATENTS

| | | | |
|---|---|---|---|
| 2,348,053 | 5/1944 | Bowker | 180/65 R X |
| 1,747,560 | 2/1930 | Weathers | 180/65 F UX |
| 3,454,122 | 7/1969 | Grady, Jr. | 180/65 R |
| 1,831,071 | 11/1931 | Jones | 180/65 R X |
| 3,546,548 | 12/1970 | Wouk | 318/139 |
| 1,423,090 | 7/1922 | Delano | 180/65 R UX |
| 2,505,770 | 5/1950 | Hill | 310/67 A X |
| 2,581,551 | 1/1952 | Myrmirides | 180/65 F X |

*Primary Examiner*—Kenneth H. Betts
*Assistant Examiner*—Milton L. Smith
*Attorney, Agent, or Firm*—Clarence A. O'Brien; Harvey B. Jacobson

[57] ABSTRACT

A vehicle is propelled by wheel mounted drive motors to which energy is supplied from a battery. During vehicle braking by a mechanical brake, a switching control is operative on the motor windings to produce a regenerative action causing electrical braking. The regenerative energy produced during the braking operation, is utilized to charge the battery.

2 Claims, 4 Drawing Figures

PATENTED FEB 19 1974　　　　　　　　　　　　　　　　　　　3,792,742

ELECTRIC MOTOR OPERATED VEHICLE

This invention relates to electrically operated vehicles and embodies certain improvements over the invention disclosed in my prior copending application, U.S. Pat. Ser. No. 83,448, filed Oct. 23, 1970.

An important aspect of the present invention resides in the efficient utilization of battery stored electrical energy to propel the vehicle through drive motors as well as to govern or regulate vehicle speed. These objectives are achieved in accordance with the present invention by mounting the drive motors directly on the traction wheel rims in association with the brake drums of mechanical brake devices. A combined mechanical and electrical braking operation is thereby effected under control of a brake pedal. By means of a solid state switching circuit, electrical braking involving a regenerative action in the drive motors, may be effected with the regenerative energy being utilized to charge the battery from which the drive motors are energized under control of an accelerator pedal. Thus, the system of the present invention may be applied to an electrical vehicle utilizing conventional wheel assemblies with appropriate modification.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
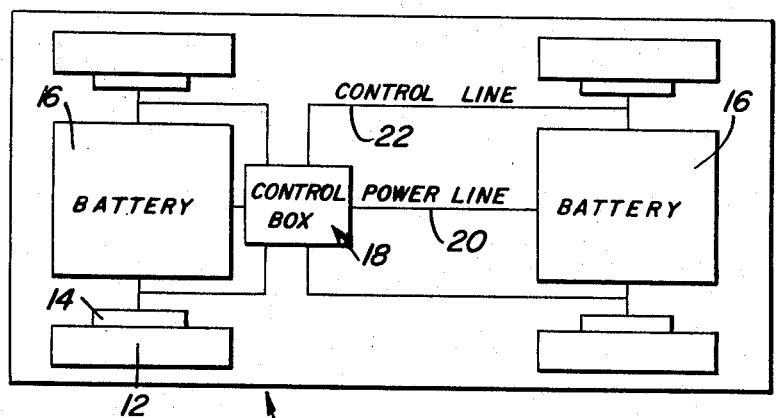
FIG. 1 is a schematic block diagram illustrating the vehicle propelling system of the present invention.

Referring now to the drawings in detail, an electrically operated vehicle is schematically illustrated in FIG. 1 generally denoted by reference numeral 10. The vehicle includes a plurality of traction wheels 12, each of which is driven by a directly connected drive motor 14. The drive motors are energized from storage batteries mounted within the battery chambers 16. Power from the batteries is supplied to the drive motors from a control box 18 to which power is fed from the batteries through the power lines 20. Control lines 22 connect the control box to the drive motors.

Figure 2:
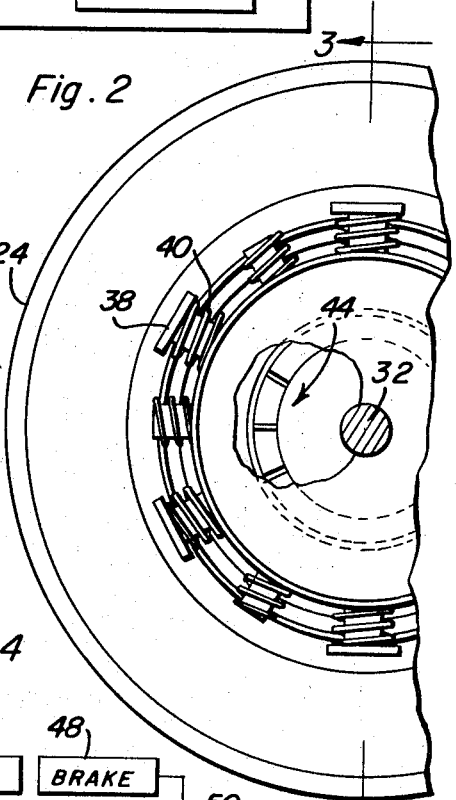
FIG. 2 is a partial side elevational view of a wheel assembly with parts broken away, constructed in accordance with the present invention.
Figure 3:
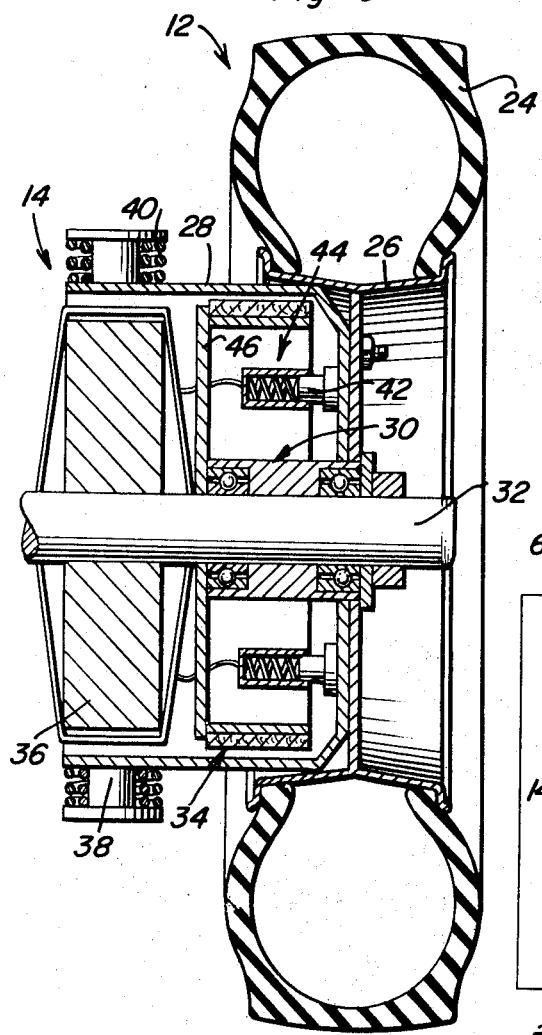
FIG. 3 is a sectional view taken substantially through a plane indicated by section line 3—3 in FIG. 2.

As shown in FIGS. 2 and 3, each of the traction wheel assemblies includes a pneumatic tire 24 mounted on a conventional wheel rim 26 having a mounting web to which a brake drum 28 is bolted. The wheel assembly including the brake drum is rotatably mounted by a bearing assembly 30 on a fixed spindle 32. A brake shoe assembly 34 is mounted on the spindle within the brake drum 28 and is adapted to be actuated by the usual brake pedal actuating system of a vehicle in order to effect mechanical braking of the wheel assembly.

In accordance with the present invention, the drive motor 14 aforementioned includes a series wound armature 36 secured to the fixed spindle 32. The motor stator assembly on the other hand is externally mounted on the brake drum 28 in axially spaced relation to the wheel rim 26 and includes a plurality of circumferentially spaced pole pieces 38 on which motor windings 40 are mounted. Electrical energy is supplied to the motor armature and stator windings through brushes 42 mounted on and rotatable with the brake drum 28 of the wheel assembly, the brushes being in wiping contact with a commutator assembly 44 fixedly mounted within the brake shoe assembly 34 on the spindle 32.

The stator of the drive motor may include both drive windings for effecting propulsion of the vehicle as well as auxiliary windings for compensation and dynamic braking functions. Alternatively, the same motor windings may be reversed in polarity for braking action. In either case, electrical braking involves a regenerative action making available regenerative energy during the braking operation. Electrical braking is designed to occur in response to actuation of the brake pedal which also causes mechanical braking through the brake shoe assembly 34. A backing plate 46 may be associated with the brake shoe assembly for positive emergency or parking braking. To reverse the direction of movement of the vehicle, the polarity of the drive windings is reversed or reverse drive motor coils are added and energized.

Figure 4:
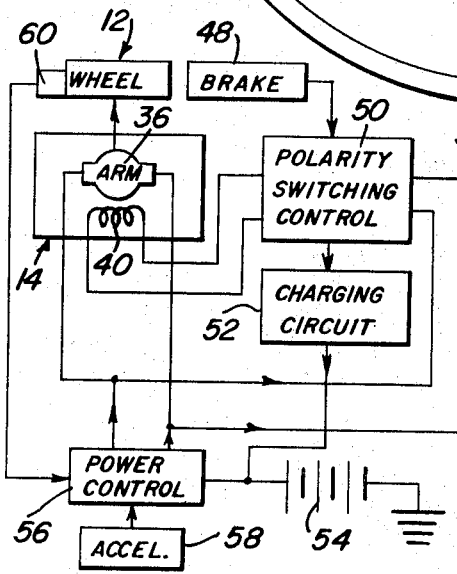
FIG. 4 is a simplified circuit diagram showing a portion of the control system of the present invention.

FIG. 4 illustrates a typical control system through which the drive control and braking functions are accomplished as aforementioned. Thus, the brake actuating control 48 is connected to a polarity switching control component 50 through which the polarity of the motor drive winding 40 may be reversed during the braking operation resulting in the supply of regenerative energy to a charging circuit 52 by means of which the battery 54 may be charged. The battery is otherwise operative to supply electrical energy to a power control component 56 which is under control of an accelerator pedal linkage 58 so as to feed electrical energy to the motor armature 36 and the stator windings 40 through the polarity switching control component. The vehicle is thus propelled by drive of the traction wheel assembly 12 which may also mount a tachometer sensing device 60 from which a signal is derived and fed to the power control component 56 in order to limit the rotational speed of the wheel assembly in accordance with the desired torque characteristics in order to obtain positive traction.

Through the polarity switching control 50 the amount of electric braking applied may be regulated and the corresponding regenerative energy obtained fed to the battery through the charging circuit to thereby make operation of the electrically powered vehicle more efficient. By mounting of the drive motors directly on the traction wheel assemblies, power losses through use of interconnecting drive arrangements are avoided. Also, the amount of modification of existing conventional wheel assemblies is reduced.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an electrically operated vehicle having a traction wheel, an electric drive motor directly coupled to the wheel, mechanical brake means mounted on said wheel, brake actuating means connected to the mechanical brake means, electrical braking means rendered operative by the brake actuating means for producing regenerative energy from the drive motor, and means for storing the regenerative energy, said traction wheel including a fixed axle, a mounting web journaled on the axle, and a tire rim secured to the web in axially spaced relation to the drive motor, said mechanical brake means including a brake drum secured to the mounting web and extending axially therefrom, and a brake shoe assembly enclosed within the brake drum axially between the drive motor and the mounting web.

2. The combination of claim 1 wherein said drive motor includes an armature fixed to the axle and a stator assembly externally mounted on the brake drum.

* * * * *